(12) United States Patent
Steinich

(10) Patent No.: US 6,381,863 B1
(45) Date of Patent: May 7, 2002

(54) MEASURING CABLE TRAVEL SENSOR

(75) Inventor: Klaus-Manfred Steinich, Poering (DE)

(73) Assignee: ASM Automation Sensorik Messtechnik GmbH, Unterhaching (DE)

( * ) Notice: Subject to any disclaimer, the term of this patent is extended or adjusted under 35 U.S.C. 154(b) by 0 days.

(21) Appl. No.: 09/358,660

(22) Filed: Jul. 26, 1999

(30) Foreign Application Priority Data

Aug. 27, 1998 (DE) .......................................... 198 39 028

(51) Int. Cl.$^7$ ................................................ G01B 3/10
(52) U.S. Cl. .............................. 33/756; 33/761; 33/763
(58) Field of Search .......................... 33/733, 1 PT, 33/755, 756, 762, 763, 761, 769, 771

(56) References Cited

U.S. PATENT DOCUMENTS

| | | | | |
|---|---|---|---|---|
| 3,474,979 A | * | 10/1969 | Erlandsson | 33/755 |
| 3,680,812 A | * | 8/1972 | Rayner | 33/761 |
| 3,780,440 A | * | 12/1973 | Taylor | 33/756 |
| 4,453,680 A | * | 6/1984 | Miller | 33/769 |
| 4,530,155 A | * | 7/1985 | Burkhardt et al. | 33/1 PT |
| 4,663,851 A | * | 5/1987 | Feichtinger | 33/1 PT |
| 4,989,329 A | * | 2/1991 | Pullen | 33/1 PT |
| 5,375,333 A | * | 12/1994 | Hecht et al. | 33/1 PT |
| 5,761,822 A | * | 6/1998 | Steinich | 33/756 |
| 6,032,380 A | * | 3/2000 | Li | 33/755 |
| 6,154,975 A | * | 12/2000 | Steinich | 33/756 |

FOREIGN PATENT DOCUMENTS

| | | | | |
|---|---|---|---|---|
| DE | 3826581 A1 | * | 2/1990 | |
| DE | 42 17 607 | | 2/1994 | |
| DE | 195 20 388 | | 12/1996 | |
| EP | 0466228 A2 | * | 1/1992 | 33/1 PT |
| GB | 2135969 A | * | 9/1984 | 33/755 |
| JP | 363082301 A | * | 4/1988 | 33/756 |
| JP | 363082302 A | * | 4/1988 | 33/756 |

* cited by examiner

Primary Examiner—Diego Gutierrez
Assistant Examiner—Madeline Gonzalez
(74) Attorney, Agent, or Firm—Jacobson Holman, PLLC

(57) ABSTRACT

A measuring cable travel sensor comprises a housing accommodating a measuring cable drum and a rotary spring operable to urge the cable drum in the direction of winding thereon a measuring cable. A rotary angle sensor is mounted to the housing on the outside thereof. The rotary angle sensor has a sensor shaft with a projecting end trunnion portion. The cable drum is fixed on the sensor shaft trunnion portion non-rotatably in concentric relationship thereon. The travel sensor is of a compact structure, in particular in its axial direction, and simple and inexpensive to produce.

25 Claims, 3 Drawing Sheets

MEASURING CABLE TRAVEL SENSOR

FIELD OF THE INVENTION

The invention concerns a measuring cable travel sensor.

BACKGROUND OF THE INVENTION

Measuring cable travel sensors are travel or distance-measuring sensors operating on the principle of a measuring cable, with a housing which is suitable for use in industrial situations. A typical travel sensor of that kind comprises a precisely defined and positioned cable drum on to which a measuring cable is wound, generally only in a single layer on the drum. One end of the measuring cable is suitably fixed to the cable drum. The other free end of the measuring cable is secured to the body or article, the variation in the position of which is to be precisely measured.

When the movable body or article moves away from or towards the cable drum of the measuring cable travel sensor, the resulting angular movements of the measuring cable drum about its axis are converted into a precise travel or distance length by means of a rotary angle sensor which is non-rotatably coupled to the cable drum. A rotary torsion spring which is operatively connected to the cable drum, generally in coaxial relationship therewith, ensures that the measuring cable is wound on to the cable drum when the movable body whose position is to be measured moves towards the cable drum, thereby to ensure that the measuring cable is properly wound on to the drum and is kept in a reasonably taut condition.

It will be noted that measuring cable travel sensors of such a kind are used in the most widely varying technical situations and assemblies, for example for determining the position of an elevator cabin in an elevator shaft, for continuously monitoring the angular positions of ailerons, control elevators and vertical rudders in aircraft and the like.

In order to achieve the desired level of measurement accuracy for such a measuring cable travel sensor, it is necessary on the one hand to ensure absolute angular truth as between the measuring cable drum and the rotary angle sensor. That inter alia requires free unimpeded rotary movement of the cable drum of the measuring cable travel sensor, under all operating conditions, as any impediment to the rotation of the cable drum could grossly falsify the measurement result. Accordingly on the one hand the cable drum must be reliably and dependably supported to permit it to rotate freely and accurately while on the other hand there is no way in which the measuring cable drum could be permitted to have its rotary movement adversely affected for example by the cable drum rubbing or the like against the housing or another component as a consequence of a mechanical loading, thermally induced distortion or the like of one of the components of the assembly.

For that reason the housings for measuring cable travel sensors were hitherto composed of a plurality of stable metal parts, more specifically on the one hand tube portions and on the other hand end plates which were respectively screwed together in the appropriate configuration.

The production of injection-molded parts of plastic material or die-cast parts of light metal or alloy has been less wide-spread both for reasons of the number of items involved and also because of the inadequate degree of accuracy, in comparison with the use of end plates and tube portions which are produced by a procedure which involves cutting machining.

In order to provide an arrangement in which the cable drum is reliably supported and free to rotate, the cable drum has hitherto generally been non-rotatably arranged on a separate shaft which is supported in the housing of the measuring cable travel sensor, and that shaft on which the cable drum is disposed is non-rotatably connected to a trunnion portion of the shaft of the rotary position sensor not directly but by way of a coupling which can compensate for angular displacement. In that case, the rotary angle sensor itself was generally fixed on the outside of the housing so that only the projecting trunnion portion of the sensor shaft extends into the housing.

Such designs of measuring cable travel sensors are cost-intensive because of the metal parts for the housing, which are expensive to machine, and they are also relatively large in the axial direction because of the separate support arrangement for the cable drum and the consequentially necessary angle coupling transmission to the rotary angle sensor.

SUMMARY OF THE INVENTION

An object of the present invention is to provide a measuring cable travel sensor which can be of a compact structural size, more especially in its axial direction, and which is simple and inexpensive to produce.

Another object of the present invention is to provide a measuring cable travel sensor which will afford accurate and reliable measurement results while nonetheless being of a simple design configuration.

Still another object of the present invention is to provide a measuring cable travel sensor which is of a robust structure such as to be capable of withstanding severe operating conditions.

Yet another object of the present invention is to provide a measuring cable travel sensor which affords the possibility of adaptation to different dimensional aspects in consideration of the operational situations in which it is to be employed.

In accordance with the principles of the present invention the foregoing and other objects are attained by a measuring cable travel sensor comprising a housing in which a measuring cable drum and a rotary spring are disposed. A rotary angle sensor is connected to the housing. The sensor has a shaft including a trunnion portion which projects out of the sensor. The cable drum is non-rotatably fixed in concentrically aligned relationship on the trunnion portion of the sensor shaft, in the axial longitudinal region of the trunnion portion where it projects from the sensor.

As will be appreciated from a description hereinafter in greater detail of a preferred embodiment of the measuring cable travel sensor according to the invention, a reduction in the size thereof in the axial direction is achieved by virtue of the elimination of the coupling referred to hereinbefore in connection with the previous designs. That is made possible by the avoidance of angular displacement as between the shaft of the cable drum and the sensor shaft, insofar as the cable drum is fitted on to the trunnion portion of the sensor shaft. In that respect, the cable drum does not have to be non-rotatably fixed directly on the sensor shaft, but it is possible also to use a concentric adaptor which is disposed therebetween. That can afford the advantage that the adaptor can project in the axial direction beyond the free end of the trunnion portion of the sensor shaft and can serve as a central, for example slotted entrainment means for the rotary or torsion spring which is disposed in the housing and which is axially spaced in relation to the cable drum.

The basic point of departure in terms of all stability considerations relating to the housing is thus the location of the connection between the rotary angle sensor and the housing. In order to permit inexpensive manufacture of the housing in the form of a molded or cast component of plastic material or light metal or alloy, more especially for example aluminum or ZN-casting, with the additional weight advantage that this entails, while affording adequate stability and strength, the housing comprises first and second half-shell portions which are fitted to each other, namely a shell portion which accommodates the rotary spring and a shell portion which accommodates the sensor, both of those being of a substantially cup-shaped configuration.

While however the rotary spring shell portion has a closed bottom, the sensor shell portion has a bottom region with a sensor opening through which the trunnion portion of the sensor shaft can project into the housing. The sensor itself is fitted to and secured to the sensor shell portion on the outside thereof. In the housing, the assembly comprising the adaptor and the cable drum is non-rotatably disposed on the trunnion portion of the sensor shaft by suitable mounting means such as clamping screws.

A very simple but nonetheless very strong and stable connection between the sensor shell portion and the sensor itself is achieved in accordance with another preferred feature of the invention by arranging on the inside of the sensor shell portion a stabilising ring in the form of a plate which comprises for example metal and which is of approximately the same size as the end face of the sensor or is of a somewhat larger outside periphery.

The stabilising ring is provided with screwthreaded bores and is screwed with a plurality of screws in a distributed array around the periphery, through the bottom of the sensor shell portion, using holding clips which mount the sensor to the sensor shell portion. For that purpose at its outside periphery the substantially cylindrical sensor has radially inwardly directed openings, preferably for example in the form of a peripherally extending annular groove, into which noses of the above-mentioned holding clips engage. When the sensor has a peripherally extending annular groove therein therefore instead of individual holding clips it is possible to use two semicircular ring clips which are each screwed to the internally disposed stabilising ring by way of a plurality of screw means. That affords a strong stable connection between the sensor and the sensor shell portion of the housing, with the connection in particular involving a substantial surface area such as not to allow strong torque forces acting at points.

In addition in accordance with a preferred feature of the invention the sensor shell portion is stiffened outside the region of contact of the stabilising ring therewith, with radially outwardly rising first radial ribs which are distributed over the entire periphery of the assembly. However the radial ribs do not extend continuously radially as far as the side walls of the sensor shell portion but terminate radially inwardly to such an extent that the casing of the cable drum which is of T-shaped or L-shaped cross-section can rotate radially outwardly of those first radial ribs, wherein the casing of the cable drum axially engages behind the radial ribs. It is only outside the region of the cable drum which rotates at that location that second radial ribs then in turn extend in an inclinedly rising configuration from the bottom of the sensor shell portion to the side walls thereof.

In accordance with another feature of the invention while the sensor shell portion, as considered in cross-section, has only one single region of the same depth and of the same free diameter, the spring shell portion is of a stepped configuration in the axial direction thereof.

The region of the spring shell portion which is of smaller diameter and which is of substantial depth in the axial direction thereof accommodates the rotary spring while the axially shallower but larger-diameter region which is therefore disposed radially around the smaller-diameter region corresponds to the dimensioning of the sensor shell portion and like same must accommodate the cable drum as, when considered in the axial direction, the plane of contact between the sensor shell portion and the rotary spring shell portion is disposed either in the region of the cable drum or in the region between the cable drum and the spring, but also in the larger-diameter region of the spring shell portion in order here to afford some play and clearance to allow for different axial lengths of the cable drum to permit different cable drums to be fitted to the arrangement.

The spring shell portion is also ribbed in a radial direction, but preferably with radial ribs which remain of the same height in their radial extent, more specifically both in the region of the bottom of smaller-diameter region and also in the region of the bottom part which extends therearound externally thereof. Arranged at the transition between the two regions of the spring shell portion are mounting pins or projections which are directed towards the sensor shell portion and on to which can be fitted a stop cover which closes off the end of the receiving region for accommodating the spring so that the spring is held at both faces thereof between the bottom part of the receiving region for accommodating the spring on the one hand and the above-mentioned cover on the other hand, and thus has a contact surface for supporting it at both faces of the spring.

In order to permit the peripheral casing portion of the cable drum to engage behind the first radial ribs of the sensor shell portion, as indicated above, the cable drum is of a T-shaped or L-shaped configuration when considered in cross-section, that is to say the radial plate member of the cable drum is not arranged on the end of the cable drum that is towards the sensor shell portion, but either centrally or on the end thereof, which is remote therefrom, in relation to the peripheral casing of the cable drum.

In addition the contact plane of the housing also extends through a cable entry connection portion which more particularly is preferably formed in one piece with the respective shell portions of the housing. The cable entry portion is preferably subdivided into a plurality of chambers which adjoin each other at different radial spacings relative to the axis of the housing so that, depending on the respective diameter of the cable drum in other aspects, cable guide elements for the cable entry can be selectively disposed in one chamber of the cable entry portion or another.

In accordance with a further preferred feature of the invention the housing is of a substantially quadrangular such as rectangular configuration in its external contour, wherein the screw means between the two shell portions constituting the housing are arranged in corner regions thereof, with the cable entry portion also being disposed in a corner region. That corner region also has the screw means between the different chambers which can be put to use of the cable entry portion.

In accordance with another preferred feature the housing and thus the entire measuring cable travel sensor can be secured in relation to other units and assemblies not by means of screws passing through the housing, which could give rise to problems in terms of maintaining sealing integrity, but instead the outside surfaces of the housing preferably have fixing grooves which are more preferably arranged parallel to the axial direction of the measuring cable travel sensor so that the housing of the measuring cable travel sensor can be fixed to the component supporting it by means of holding clips which can be screwed to that component, in a position of co-operating with the above-mentioned grooves.

As the cable entry portion is in operation heavily subjected to a wear loading by virtue of the cable sliding thereagainst, the cable entry portion is preferably generally provided with a spout-shaped cable guide portion which is fitted into the wall of the desired chamber of the cable entry portion, although it can also be formed in one piece therewith. The cable guide portion is preferably made from polyether ethylene ketone (PEEK) which is particularly resistant to high temperature and abrasion wear. PEEK can also be injection-molded or produced from the solid by cutting machining.

Further objects, features and advantages of the invention will be apparent from the description hereinafter of a preferred embodiment thereof.

BRIEF DESCRIPTION OF THE DRAWING

FIG. 2b shows a partly sectional side view of the sensor shell portion shown in FIG. 2a.

FIG. 3b shows a sectional side view of the shell portion shown in FIG. 3a.

DESCRIPTION OF THE PREFERRED EMBODIMENT

Figure 1:
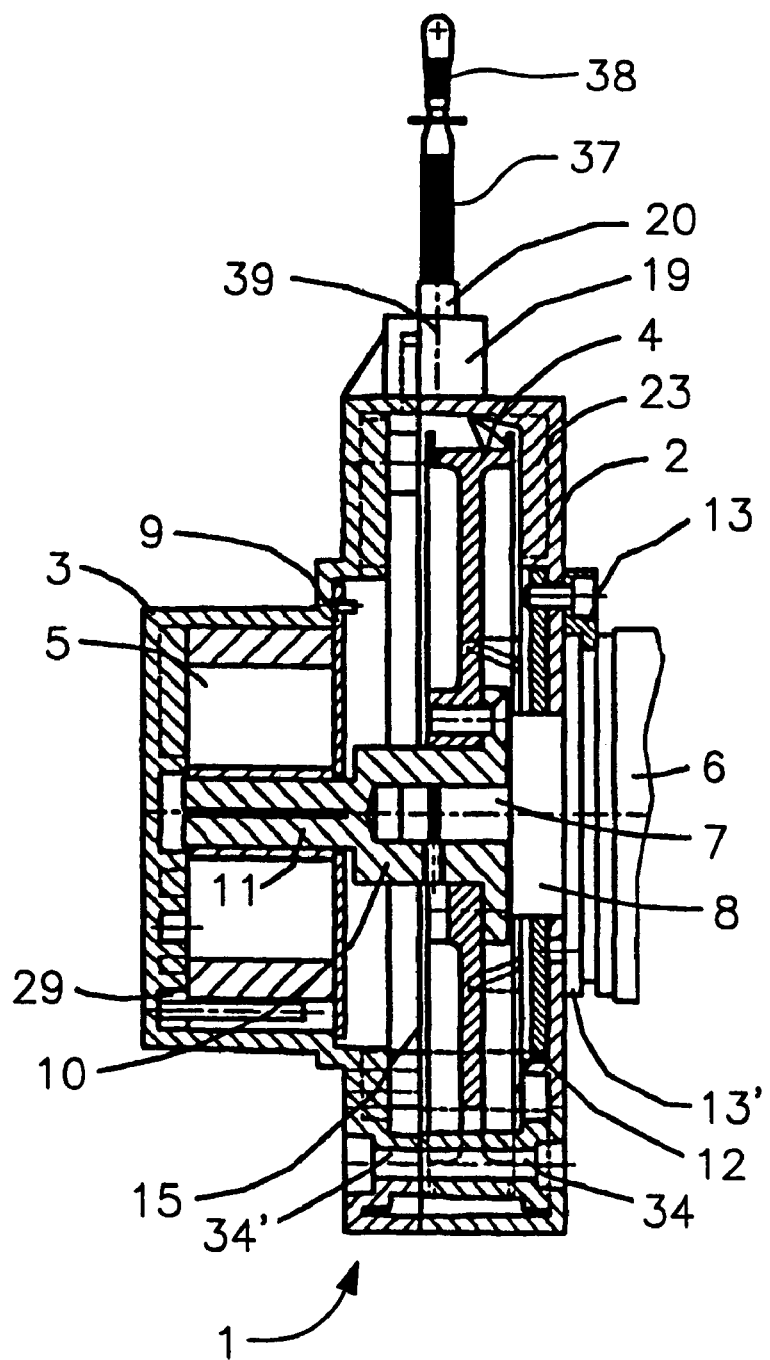
FIG. 1 is a view of an assembled measuring cable travel sensor according to the invention in axial section therethrough.

Referring firstly to FIG. 1, shown therein is a side view in cross-section of a measuring cable travel sensor according to the invention in the fully assembled condition, comprising generally a housing which is diagrammatically indicated at 1 and a rotary angle sensor 6 which is mounted to the housing 1 but of which only part is shown in FIG. 1. The housing 1 is primarily formed by first and second half-shell portions, more specifically a shell portion 2 for mounting the sensor 6 on the outside thereof, referred to as the sensor shell portion, and a shell portion 3 for accommodating a rotary or torsion or spiral spring which is diagrammatically shown at 5 in FIG. 1. The shell portions 2 and 3 are shown as a face view and a sectional view separately in FIGS. 2a, 2b and FIGS. 3a, 3b respectively, the view on to the respective sections in FIGS. 2b and 3b corresponding to that involved in FIG. 1.

The two shell portions 2 and 3 of plastic material such as POM or PBTP produced as injection moldings are provided with a radial rib configuration which is disposed in the interior of the respective shell portion in order to ensure the highest possible level of stability for the assembly or the necessary stability with the minimum possible usage of material and the smallest possible wall thicknesses. In this arrangement the ribs extend radially in a radiating configuration at respective angular spacings of for example about 20°.

Figure 2A:
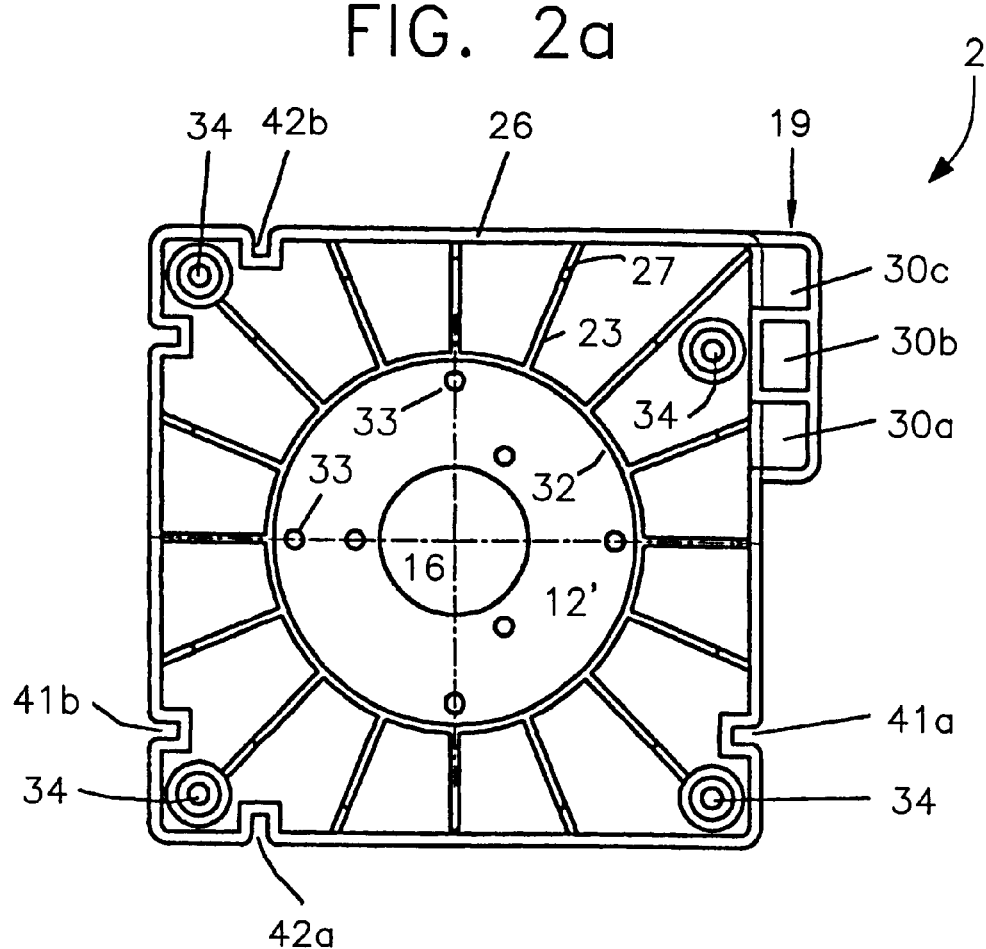
FIG. 2a shows a face view of a sensor shell portion forming part of the housing of the measuring cable travel sensor shown in FIG. 1.
Figure 2B:
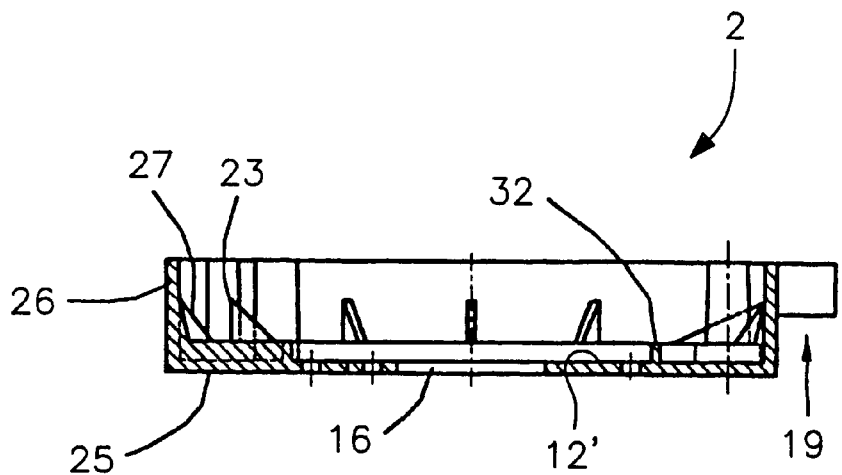

In the case of the sensor shell portion 2, as FIGS. 2a and 2b show, the rib configuration is divided into two, as considered in a radial direction, as follows:

First, inwardly disposed radially extending ribs 23 rise in a radially outward region thereof and terminate in a tip which is at the same respective spacing for each rib 23, from the center of the sensor shell portion 2. That spacing is less than the inside diameter of the peripheral casing portion of the measuring cable drum which is indicated at 4 in FIG. 1 and which therefore rotates radially outwardly of the first radial ribs 23.

At a spacing radially outwardly of the outer ends of the ribs 23, second, radially outer radial ribs 27 in turn begin to rise from the inside outwardly. It will be seen from FIG. 2b however that the outer ribs 27 do not terminate free at the radially outward ends but go into side walls 26 of the sensor shell portion 2.

As FIG. 2b more clearly shows, the radially inward, first radial ribs 23 begin at an annular ring 32 which also represents an annular rib which projects up from the bottom of the sensor shell portion 2. It will be seen that the rib forming the annular ring 32 is smaller in height than the ribs 23 and 27. The above-mentioned ribs are formed in one piece together with the bottom and the side walls, which extend therearound, of the sensor shell portion, and they are also formed in one piece with a cable entry portion 19 which, as shown in FIG. 2a, has a plurality of different cable entry chambers 30a–30c. The cable entry is selectively disposed in one of those chambers 30a–30c depending on the respective direction of extension of the cable, the length of the cable which is to be disposed on the cable drum 4, and other relevant factors. For that purpose, a cable guide element 20 which must comprise a material such as for example PEEK that is highly resistant to abrasion wear and high temperature is to be arranged in one of those chambers which in addition must be provided with a bore for the cable to be passed therethrough.

Arranged centrally in the bottom of the main part of the sensor shell portion 2 which is of substantially square configuration in plan view and at the one side edge thereof in a corner region of the cable entry portion 19 with the cable entry chambers 30a–30c and thus in concentric relationship with the ribs 23, 27 and 32, in the bottom of the sensor shell portion 2 is a circular sensor opening 16 through which in the assembled condition the centering collar or shoulder indicated at 8 in FIG. 1 of the externally mounted sensor 6 projects into the interior of the housing 1.

In addition, provided in the bottom of the sensor shell portion 2 within the radial ring 32 are a plurality of bores 33 which more specifically are disposed at equal spacings relative to the center of the sensor shell portion 2. The bores 33 are disposed in a support region which is diagrammatically indicated at 12' and which serves for screw-mounting a stabilising ring which is indicated at 12 in FIG. 1 and which is put on to the bottom of the sensor shell portion 2 and the inside and outside diameters of which are so selected that the stabilising ring 12 preferably entirely covers the region between the outside periphery of the sensor opening 16 and the inside periphery of the radial ring 32. The thickness of the stabilising ring 12 is smaller than or at a maximum equal to the height of the radial ring 32.

Clips indicated at 13 in FIG. 1 which are disposed on the outside of the sensor shell portion 2 are screwed to the stabilising ring 12 through the bores 32 by means of screws which are screwed in from the exterior. The clips 13 bear against the outside surface of the end plate portion 25, that is to say the bottom, of the sensor shell portion 2, but at a spacing from that plate portion 25 they have a radially inwardly directed projection indicated at 13' which preferably also extends over the entire peripheral region of the clips 13. The clips 13 are each of a part-annular configuration. The projection 13' fits into an annular groove in the outer periphery of the sensor 6 when the latter is fitted to the outside surface of the plate portion 25 in such a way that the centering shoulder or collar 8 of the sensor 6 fits into the opening 16 in the housing and a trunnion portion 7 forming a free end part of the shaft of the sensor 6 projects into the interior of the sensor shell portion 2 and thus into the interior of the housing 1.

Using the part-annular clips 13 or also a larger number of individual clips which are no longer of a for example semicircular configuration makes it possible to avoid directly screwing the sensor 6 to the housing, for example with the stabilising ring 12 thereof, and thus avoids point loadings being applied to the sensor 6.

Disposed in the corner regions of the sensor shell portion 2 are screw passages 34 which are also stiffened by individual ribs extending around each thereof. The sensor shell portion 2 is screwed through the screw passages 34 to the other shell portion, more specifically the spring shell portion 3 which has similar screw passages indicated at 34' in FIG. 3a, when the shell portions 2 and 3 are assembled together. In that corner region in which the cable entry portion 19 is arranged on the main body part of the sensor shell portion 2, the corresponding screw passage 34 is disposed at the level of a preferably central cable entry chamber 30b which is closed and cannot be used for cable entry but which only serves for stiffening and reinforcing purposes.

In addition the side walls 26 form on each two mutually opposite sides at mutually oppositely disposed positions fixing grooves 41a, 41b, 42a, 42b which are directed inwardly, in perpendicular relationship in the side wall. In the fully assembled condition of the measuring cable travel sensor according to the invention, those fixing grooves serve to fix the sensor to a component (not shown) which supports it as part of the surrounding structure, by means of holding clips (also not shown) which can suitably engage into the respective fixing grooves 41a, 41b, 42a, 42b. As the fixing grooves do not represent an opening which leads through into the interior of the housing 1, a clip-type fixing of that kind is to be preferred to direct screwing which involves bores passing through the housing and opening into the interior thereof, quite apart from the fact that the forces involved are transmitted to the housing 1 in a more uniform fashion.

For that reason, the pairs of fixing grooves 41a, 41b and 42a, 42b respectively are arranged relatively close to a respective one of the sides of the housing and are only set back therefrom to such an extent that no collision occurs with the screw passages 34 which are provided in the respective corner regions and which are reinforced by annular ribs extending therearound. Preferably, associated with each of the pairs of fixing grooves 41a and 41b are side walls which are at an angle relative to each other.

Figure 3A:
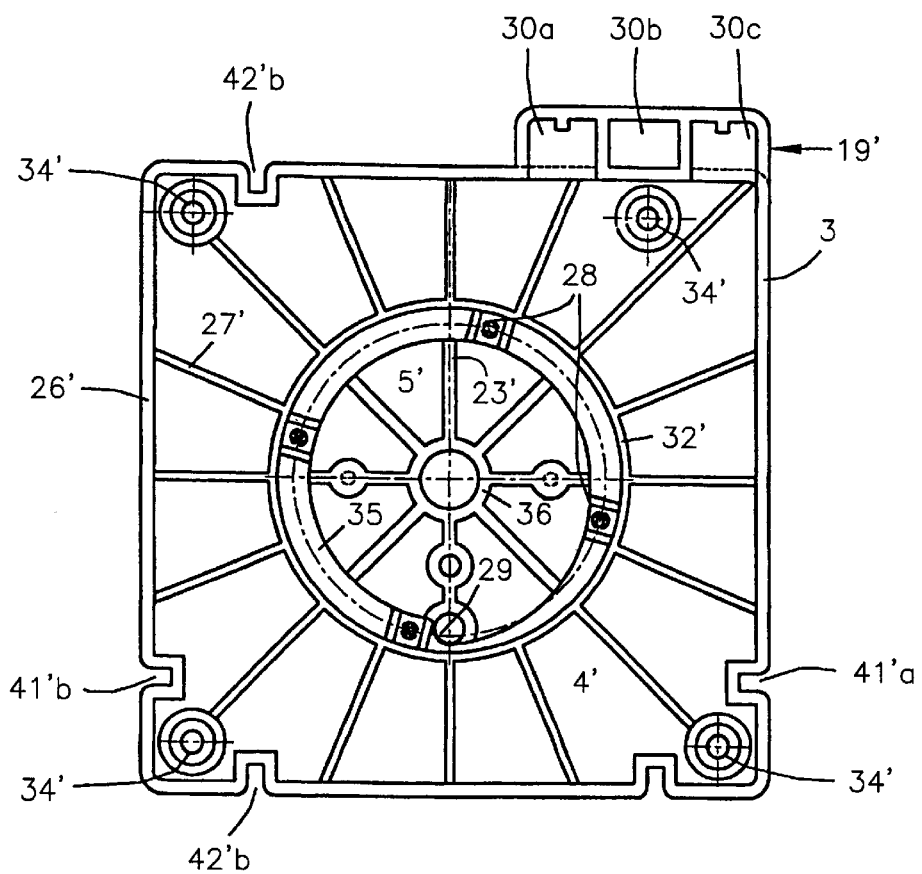
FIG. 3a shows a face view of the spring shell portion forming part of the housing of the measuring cable travel sensor according to the invention.
Figure 3B:
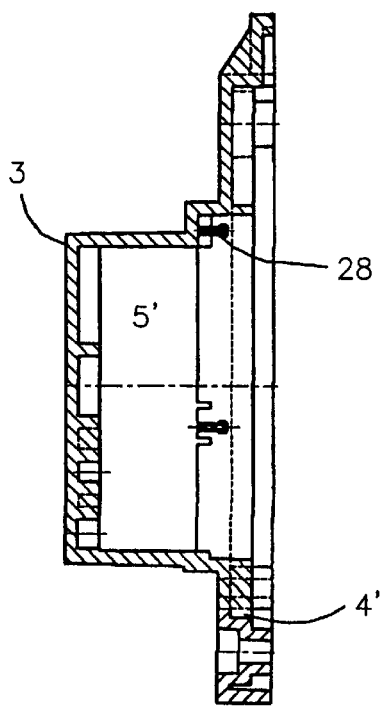

Looking now in greater detail at FIGS. 3a and 3b, the spring shell portion shown therein basically differs from the sensor shell portion 2 in that the bottom of the spring shell portion 3 does not have an opening therethrough and, as considered in the cross-sectional view in FIG. 3b, the generally cup-shaped receiving region of the spring shell portion for accommodating the spring 5 is of a stepped configuration, with a central, deeper receiving region 5' for accommodating the spring and a shallower receiving region 4' for accommodating the measuring cable drum 4, the region 4' being of larger diameter than the smaller-diameter region 5' and extending radially therearound.

It will be appreciated that, as shown in the sectional view in FIG. 1, the cable drum 4 is disposed entirely to the right of the plane of contact as indicated at 15 where the shell portions 2 and 3 meet, that is to say the cable drum 4 is disposed completely in the sensor shell portion 2, but the shallow receiving region 4' which is provided in the spring shell portion 3 is necessary so that if appropriate it is possible to use wider or larger cable drums 4, depending on the respective situation of use involved.

In the case of the spring shell portion 3 the rib-forming radial ring 32' projects at the inner periphery of the shallower receiving region 4' for the cable drum 4 and radial ribs 27' extend outwardly therefrom to the side walls 26' to which they are integrally joined. In that arrangement the radial ribs 27' do not rise in the radially outward direction but retain their height, generally the height of the radial ring 32', over the whole of their radial extent.

The configuration of the fixing grooves 41'a, 41'b, 42'a, 42'b and the cable entry portion 19' with the various cable entry chambers defined thereby corresponds to that of the sensor shell portion 2 and likewise also the screw passages 34'.

The radially smaller but deeper receiving region 5' for accommodating the rotary spring is disposed concentrically with respect to the center, that is to say with respect to the subsequent position of the trunnion portion 7 of the sensor shaft of the sensor 6, and at its outer periphery has a raised peripherally extending annular flange 35 from which pins or projections 28 project. The pins or projections 28 thus face towards the free side of the spring shell portion 3 and are of a slotted configuration centrally in the longitudinal direction from their free end, in known manner. They serve for fitting on the plate-shaped contact or stop cover 9 which is shown in FIG. 1 and the outer periphery of which approximately corresponds to the inner periphery of the radial ring 32'. The annular flange 35 is arranged partially eccentrically along the inner periphery of the radial ring 32', insofar as, as can be seen from FIG. 3a, the annular flange 35 is of a decreasing width over approximately a quarter of a circle, whereby there is a step in regard to the width in the annular flange 35 at a location at the periphery thereof. Arranged in that step in the width of the annular flange 35 is a blind hole which is indicated at 29 in FIG. 3a and which is also accessible from the inside of the spring shell portion 3. The blind hole 29 serves for subsequently fixing the end of the wound spring 5 in the receiving region 5', preferably by means of a pin or bolt which is fitted into the blind hole 29 and which is suitably connected to the end of the spring 5, which is arranged at the outer periphery of the spring 5.

The inner end of the winding of the spring 5 is fitted into the longitudinal slot in the entrainment trunnion portion 11 of an adaptor 10 which is fitted non-rotatably in aligned coaxial relationship on to the trunnion portion 7 at the end of the sensor shaft of the rotary angle sensor 6, and is connected to the trunnion portion by means of a suitable clamping screw means, as can be seen from FIG. 1.

Also arranged in the bottom of the inwardly disposed and deeper receiving region 5' for accommodating the spring 5 are inner radial ribs 23' which are also of a uniform height and which extend from an inner radial ring 36 outwardly into the peripheral walls of the deeper receiving region 5'.

Reference will again be made to FIG. 1 showing the measuring cable travel sensor in the assembled condition thereof. Illustrated therein is an end, provided with a rubber stopper 37, of the measuring cable which is not shown in total but which is only indicated by the broken line 39 and at the end of which is disposed a fixing eye 38. The measuring cable is wound on the periphery of the cable drum 4. The cable drum 4 is non-rotatably connected in fixed angular relationship to the adaptor 10, by the adaptor 10 passing through a central opening in the cable drum 4 and being screwed thereto in the axial direction.

In the end remote from the spring 5 the adaptor 10 has an axial bore for insertion of the trunnion portion 7 constituting the free end of the sensor shaft of the rotary angle sensor 6.

Assembly of the measuring cable travel sensor takes place in the following sequence:

On the one hand the sensor 6 is secured to the sensor shell portion 2 by means of the stabilising ring 12 and the part-annular clips 13.

On the other hand, firstly the cable drum 4 together with the measuring cable indicated at 39 is fixed to the adaptor 10, and then on the one hand the cover 9 and on the other hand the spring 5 are then fitted on to the entrainment trunnion portion 11 of the adaptor 10. That entire unit is now fitted into the spring shell portion 3 and in that case the outwardly disposed end of the spring 5 is also fixed in the blind hole 29 and the cover 9 is fitted on to the pins or projections 28 on the spring shell portion 3.

The two pre-assembled half-shell portions, that is to say the sensor shell portion 2 with its associated components and the spring shell portion 3 with its associated components are then fitted together with insertion of the measuring cable into the required cable entry chamber 30a or 30c which are provided by suitably arranging a bore or a slot therein and fitting therein a cable guide element 20.

After the two shell portions 2 and 3 have been screwed together by passing suitable screws through the screw passages 34, 34', the assembly procedure is completed and the measuring cable travel sensor can be fixed to a component of surrounding structure by means of the fixing grooves 41a, 41b and 42a, 42b respectively and clips which fit thereto.

It will be appreciated that the above-described embodiment of the invention has been set forth solely by way of example and illustration of the principles thereof and that various modifications and alterations may be made therein without thereby departing from the spirit and scope of the invention.

What is claimed is:

1. A measuring cable travel sensor comprising
a housing,
a cable drum,
means rotatably mounting the cable drum in the housing,
a measuring cable adapted to be wound on to and unwound from the cable drum upon rotational movement thereof,
a spring engaging the cable drum and operable to urge it in the winding-on direction, and
a rotary angle sensor connected to the housing,
the sensor including a trunnion portion projecting from the sensor and having an axial lengthwise region,
the cable drum being fixed in non-rotational concentric aligned relationship on the trunnion portion of the sensor, the cable drum being fixed in the axial lengthwise region of the trunnion portion, the sensor closely fitting to an outside surface of the housing.

2. A measuring cable travel sensor as set forth in claim 1 wherein the rotary angle sensor is arranged on the housing externally thereof.

3. A measuring cable travel sensor as set forth in claim 1 wherein the housing comprises only two substantially cup-shaped shell portions comprising a first shell portion accommodating the spring and a second shell portion on which the rotary angle sensor is fixed externally thereof.

4. A measuring cable travel sensor as set forth in claim 3 wherein the second shell portion has an opening therein for mounting a portion of said rotary angle sensor therein,
and including
means mounting the rotary angle sensor to the outside of the second shell portion in concentric relationship with said opening in the second shell portion, said mounting means comprising a stabilising ring on the inside of the second shell portion, opening means in the peripheral surface of the rotary angle sensor, holding clips having holding noses engaging radially inwardly into the opening means in the peripheral surface of the rotary angle sensor, and screw means interconnecting the stabilising ring and the holding clips.

5. A measuring cable travel sensor as set forth in claim 4 wherein said holding clips comprise at least first and second part-annular clip members.

6. A measuring cable travel sensor as set forth in claim 4 wherein said opening means comprise a groove.

7. A measuring cable travel sensor as set forth in claim 4 wherein the cable drum has a peripheral casing portion, and
wherein the second shell portion is of a plate-shaped configuration in a contact region for said stabilising ring and radially outwardly of said contact portion has substantially radially outwardly extending inclinedly rising first radial ribs which terminate radially within the peripheral casing portion of said cable drum.

8. A measuring cable travel sensor as set forth in claim 3 wherein the housing includes a cable entry portion through which the cable extends into said housing, and including a cable guide element disposed in said cable entry portion,
wherein a contact plane at which said first shell portion and said second shell portion are in contact with each other extends through the cable entry portion of the housing.

9. A measuring cable travel sensor as set forth in claim 3 wherein the second shell portion has an end plate portion and side wall means, and
wherein the free internal cross-section of the second shell portion is greater than the outer periphery of the cable drum and including in the region outside the outer periphery of the cable drum between the end plate portion and side wall means of the second sensor shell radially outwardly and inclinedly rising second radial ribs.

10. A measuring cable travel sensor as set forth in claim 3
wherein said first shell portion has a central receiving region for accommodating said spring and a receiving region which is of axially shallower depth than the first receiving region and which is of larger diameter than same, for accommodating said cable drum, and further including at the transition between said first and second receiving regions projection means which protrude towards the larger-diameter second receiving region for mounting a contact cover on said projection means.

11. A measuring cable travel sensor as set forth in claim 10
wherein said first receiving region has a bottom portion and said second receiving region which is arranged radially therearound also has a bottom portion, and
wherein said bottom portions of said first and second receiving regions are radially ribbed on the inward side of the first shell portion.

12. A measuring cable travel sensor as set forth in claim 10 and further including
a radially projecting abutment means for co-operating with the end of said spring, disposed in the peripheral region of said first receiving region accommodating said spring.

13. A measuring cable travel sensor as set forth in claim 3
wherein a contact plane at which said first and second shell portions are in contact with each other is disposed in the axial direction of the measuring cable travel sensor between said spring and said cable drum.

14. A measuring cable travel sensor as set forth in claim 3
wherein a contact plane at which said first and second shell portions are in contact with each other is disposed in the region of the cable drum.

15. A measuring cable travel sensor as set forth in claim 3
wherein both said first shell portion and said second shell portion have integrally formed thereon protrusion portions of a half-shell configuration constituting a cable entry portion which is divided radially with respect to the axial direction of the travel sensor into at least first and second mutually adjoining cable entry chambers thereby to enable the cable entry to be adapted to a respective diameter of the cable drum.

16. A measuring cable travel sensor as set forth in claim 15
wherein the first and second shell portions have corner regions and screw means screwing them together in said corner regions and wherein said housing has a cable entry portion disposed in a said corner region, the screw means in said corner region being disposed between the cable entry chambers.

17. A measuring cable travel sensor as set forth in claim 3
wherein the first and second shell portions are of peripheral contours which coincide in the axial direction of view thereon.

18. A measuring cable travel sensor as set forth in claim 3
wherein said first and second shell portions comprise a plastic material.

19. A measuring cable travel sensor as set forth in claim 18
wherein said plastic material comprises POM.

20. A measuring cable travel sensor as set forth in claim 18
wherein said plastic material comprises PBTP.

21. A measuring cable travel sensor as set forth in claim 18
wherein the first and second shell portions are produced in the form of an injection molding.

22. A measuring cable travel sensor as set forth in claim 1 and including
an adaptor for indirectly rotatably fixing the cable drum on said sensor trunnion portion,
wherein the adaptor has an entrainment trunnion portion which projects beyond the free end of the sensor trunnion portion in aligned relationship therewith and which has a free end extending into an inner periphery of said first shell portion.

23. A measuring cable travel sensor as set forth in claim 1
wherein said housing is of a substantially rectangular external contour.

24. A measuring cable travel sensor as set forth in claim 1 and further including
fixing grooves extending in side surfaces of the housing in the axial direction of the travel sensor and disposed on first and second respective mutually oppositely disposed side surfaces at an equal spacing to the connecting side surface, the arrangement being such that the housing can be positively lockingly secured to other structural means by holding means.

25. A measuring cable travel sensor comprising
a housing,
a cable drum,
means rotatably mounting the cable drum in the housing,
a measuring cable adapted to be wound on to and unwound from the cable drum upon rotational movement thereof,
a spring engaging the cable drum and operable to urge it in the winding-on direction, and
a rotary angle sensor connected to the housing,
the sensor including a trunnion portion projecting from the sensor and having an axial lengthwise region,
the cable drum being fixed in non-rotational concentric aligned relationship on the trunnion portion of the sensor, the cable drum being fixed in an axial lengthwise region of the trunnion portion,
the housing comprises only two substantially cup-shaped shell portions comprising a first shell portion accommodating the spring and a second shell portion on which the rotary angle sensor is fixed externally thereof, and
the second shell portion having an end plate portion against an outside surface of which the rotary angle sensor closely fits.

* * * * *